Dec. 22, 1953        W. T. BISSELL ET AL        2,663,583
                AXLE STOP FOR JOURNAL BOXES
Filed Nov. 17, 1950                    4 Sheets-Sheet 1
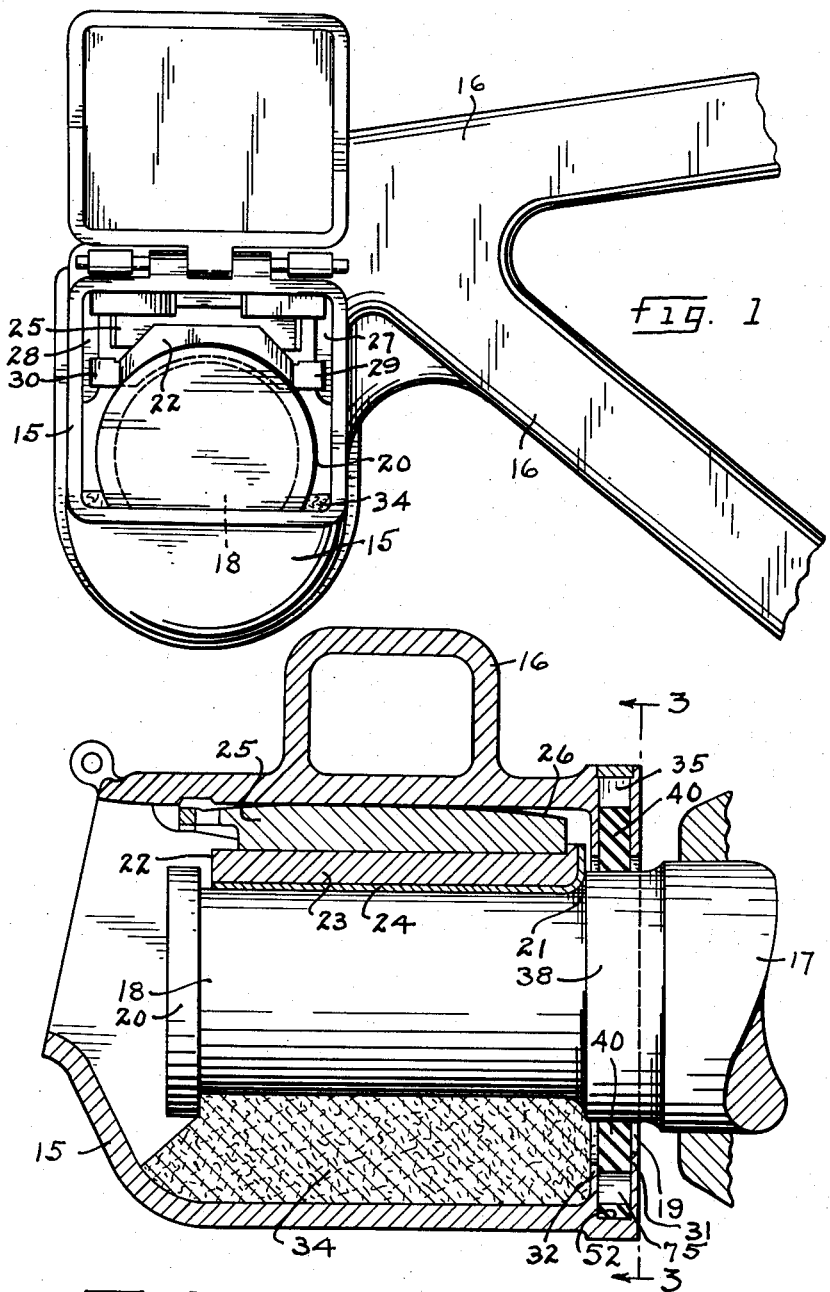
INVENTORS
WILLIAM T. BISSELL
THOMAS W. POTTER
By Herbert A. Weinturn,
ATTORNEY

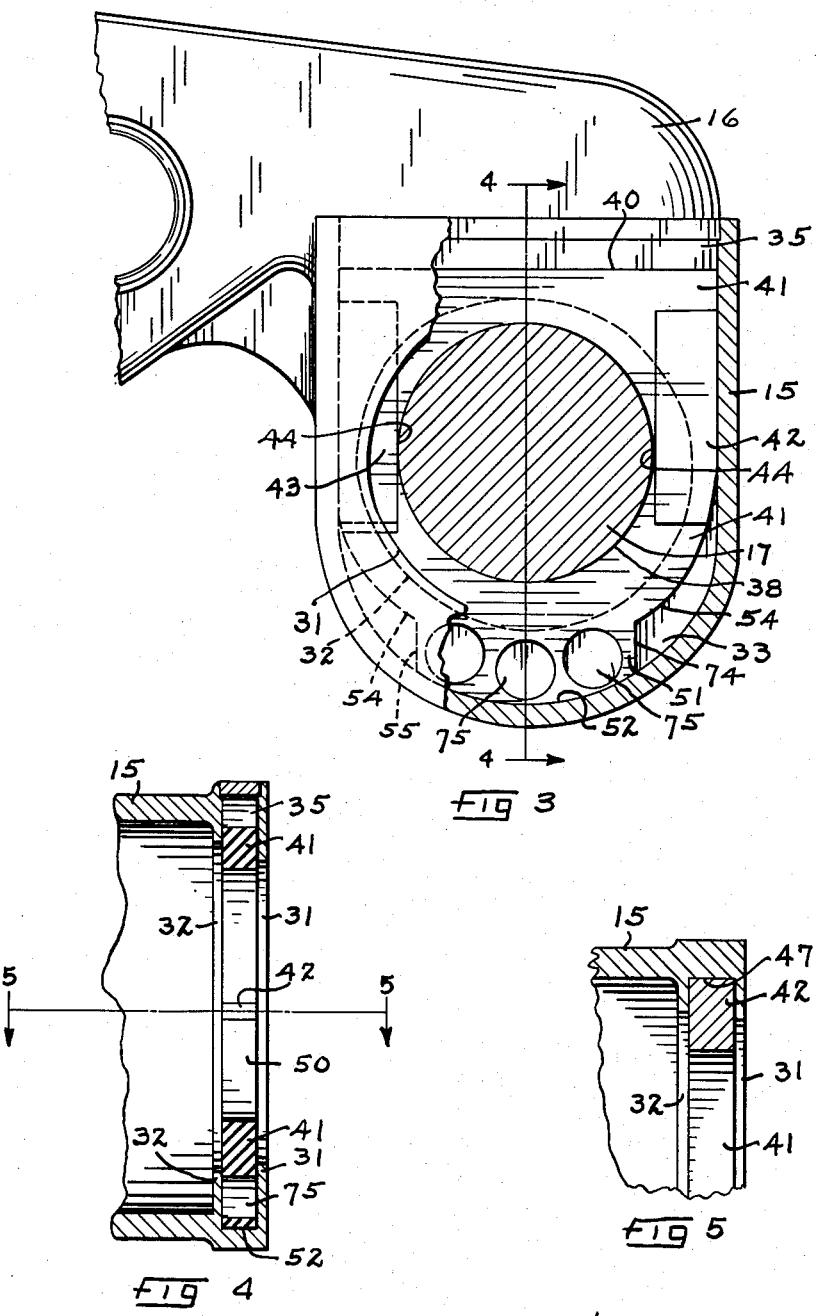

Dec. 22, 1953  W. T. BISSELL ET AL  2,663,583
AXLE STOP FOR JOURNAL BOXES
Filed Nov. 17, 1950  4 Sheets-Sheet 3

INVENTORS
WILLIAM T. BISSELL
THOMAS W. POTTER
By Herbert A. Minturn,
ATTORNEY

Dec. 22, 1953   W. T. BISSELL ET AL   2,663,583
AXLE STOP FOR JOURNAL BOXES
Filed Nov. 17, 1950   4 Sheets-Sheet 4

INVENTORS
WILLIAM T. BISSELL
THOMAS W. POTTER
By Herbert A. Minturn,
ATTORNEY

Patented Dec. 22, 1953

2,663,583

UNITED STATES PATENT OFFICE 2,663,583

AXLE STOP FOR JOURNAL BOXES

William T. Bissell and Thomas W. Potter, Indianapolis, Ind., assignors to Journal Box Servicing Corporation, Indianapolis, Ind., a corporation of Indiana Application November 17, 1950, Serial No. 196,208

3 Claims. (Cl. 286—6)

This invention involves in general a railway journal box and a dust guard, and particularly, a dust guard which may be used with a standard journal box to a serve as a stop to limit the fore and aft, or what may be termed the transverse travel of the axle relative to the box.

In general, the primary object of the invention is to avoid hot boxes which have been pestering the industry, and to maintain journal bearings in service over long periods of time, with the proper lubrication, such time being limited by the normal wear of the lining to that degree where it becomes too thin for safe use in further operation.

Specifically, the object of the invention is to overcome or solve the problems set out under the following facts.

In the first place, the journal box herein referred to is of that type as is shown in Figs. 1, 2, and Fig. 12, wherein there is a cast steel or malleable box engaged by the side frame of a truck involving the use of from two or more axles. The box in question is of that type, into which extends the journal of the wheel axle to have a bearing brass carried over the top side thereof, the brass being lined by a bearing material of rather soft nature, such as Babbitt material or variations thereof. Then over the top of the brass there is positioned a wedge which has an upper surface curved longitudinally of the journal to bear against the upper inside wall of the box.

The journal extends into the box from the rear or inner side thereof, through an opening, to have a larger diameter portion of the axle presented free of contact with the marginal portion of the box around that opening. In this marginal portion around the opening, there is provided a well in which is slidingly carried what is termed a dust guard in order to prevent the entrance of water and dust and dirt into the box.

To lubricate the journal in its contact with the over-riding bearing, the under side of the box is packed with an oiled waste in a very particular, and well defined manner wherein the waste serves as the medium to convey oil to the journal surface, as well as to filter out any dust and dirt which may enter the box.

No means is provided to limit the fore and aft travel of the axle relative to the box other than by the over-riding bearing, which bearing at most covers a very small part of the upper side of the journal. In fitting a new bearing to the journal, this arc of contact is considered to be satisfactory when it is not less than two inches. Then under service, the bearing adjusts itself to the contour of the journal to bring in a further length of arc of contact therewith.

The result of this construction is that under conditions encountered daily in railroad practice, the axle may be shifted relative to the box to such an extent that the enlarged diameter portion above mentioned will strike the margin of the opening in the back side of the box under extreme conditions but the important thing that occurs is that in any intermediate position from the normal position, the bearing is lifted from the journal at one side by reason of the fact that the axle in motion tends to travel to one side of that bearing, and in so doing, the effect is to actually lift the bearing and separate it at least from one longitudinal edge side from the journal.

With that action in mind, it has become well known in recent years that "waste grabs" occur when that bearing is actually separated from the journal and drops back down thereon. In the travel of the axle to one side of the box while the bearing is being lifted therefrom, the waste packing below is tended to be squeezed around the journal onto that side from which the bearing is lifted, with the result that any loose strands of the waste flying upwardly around the journal, will travel under that bearing and then when the bearing drops back down again, the bearing will seat itself on top of that part of the waste to "grab" the waste and retain it between the bearing and the journal. The result is that lubrication fails, the journal becomes hot, and unless noticed very promptly, and the rotation of the axle be stopped, a "hot box" develops wherein the oil itself and the waste may become ignited from this heat generation, or in any event, the liner of the bearing be melted and flowed out, with the result that the journal itself becomes overheated, and in some cases has been known to actually flow and twist off or crystallize and break off, causing severe wrecks.

For a definition of what is meant by "waste grab," attention is directed to the Lubrication Manual prepared by the Association of American Railroads and adopted in 1949, to become effective January 1, 1950. A definition of the term "waste grab" is found on page 20, in section 12, under the general title of "Cause of hot boxes." The definition there set out is as follows: "This is the term applied to threads or particles of waste which get between the bearing and the journal on the rising side, acting as an oil wipe and causing a dry spot back of it. It may be caused by loose threads and lint wedging themselves between the bearing and journal, which emphasizes the importance of keeping loose threads tucked under and using packing free from lint. This wedging is most likely to occur when a standard size bearing is applied to a minimum size journal, or one which is worn close to the limit. Packing rolled up on one side of the box is an invitation to waste grab. Rough handling in the yards, or severe buffing shocks in trains, may cause displacement of the bearing on the journal for an instant, long enough for bits of waste to get under it."

Attention is also directed to the pamphlet entitled Rules and Instructions for the Lubrication and Care of Waste Packed Journals, etc., published by the Baltimore and Ohio Railroad Company, Motive Power Department, under date of August 1, 1944. This pamphlet gives instructions to employees on the maintenance of journal boxes, the handling of hot boxes, journal box inspection, and the like.

Attention is specifically directed to the fact that in order to prevent the lifting of the waste on one side of the journal when the bearing is momentarily lifted therefrom, the practice has come into existence to use packing retainer springs. These springs in various designs are employed to press down the waste on both sides of the journal in order to afford some means of resistance to the displacement of the waste by shifting of the journal in the box in the transverse manner above indicated. One form of such retainer springs is to be found in Fig. 8, page 19 of this Baltimore and Ohio Railroad Company's pamphlet. There is also a series of patents on such waste retainers, of which Patent No. 2,492,724, to Wilson et al., issued December 27, 1949, is a good example.

Another condition which has been noted from time to time as causing failure of bearings in these journal boxes is the loosening of the liner from the brass back, or the flowing of the liner outwardly from under the brass along either or both brass edges to destroy the normally formed oil groove therealong. These last two types of bearing failure have been found to disappear with the use of the present invention.

In spite of the fact that present railroad operating conditions now find the use of cars carrying one hundred tons of pay load, such as in the iron ore district, and the use of air brake pressures up to one hundred and ten pounds whereas only a few years ago, the maximum pressure was 70 pounds, together with the fact that all equipment is tending to become heavier, and is being operated at far greater speeds than were employed a few years ago, the design of the journal box, the journal itself, and the bearing thereon, has not changed in any essential detail. For example, as reported in the year book of railroad information, 1944 edition, by the eastern railroad presidents conference committee on public relations, in the year of 1921, each serviceable freight car on the lines of the railways travelled by it, averaged 25.8 miles per day. In 1943, this average was raised to 51.0 miles per day, a 98% increase over the 1921 year mark. Then in 1921 the average freight train speed including all stops was 11.5 miles per hour. By 1943, this average was increased to 15.4 miles per hour or an increase of 34%. Then in 1921, each active freight locomotive travelled on the average 78.2 miles per day, while in 1943, this average was increased to 124.5 miles per day. Not only was that increase found, but the average freight train carried 651 tons of freight in 1921, whereas in 1943, the average load per train was raised 1116 tons. The increase has been considerable since 1943.

The point is that the journal boxes and bearings are being subjected to greater loads and stresses than they ever were before, in spite of the fact that there has been no change of any consequence in the box and bearing design.

In spite of all of the various devices employed up to date, hot boxes have continued to plague the railway industry. The newer cars being built and put into service require stronger under frames to take care of the switching and "humping" impacts as well as the higher air brake pressures, the heavier loads, the higher speeds, and the like.

One railroad just recently attempted to overcome the hot box problem by replacing all of the waste in all of the journal boxes with new waste saturated with a premium oil, all at a greater expense than heretofore employed in the packing and oiling of the journal box bearings, but nevertheless there were more hot boxes under these conditions than before in the same period. In other words the problem resided in something other than merely holding down the waste packing, changing the oil or type of waste in the journal box in order to overcome the hot box problem and the failure of bearings.

Therefore as above indicated, the present invention constitutes a discovery solving the above indicated problems.

The invention is described in reference to the accompanying drawings, in which

Fig. 1 is a view in outer end elevation of a journal box structure to which the invention is applied;

Fig. 2 is a central longitudinal section through the journal box;

Fig. 3 is a transverse vertical section on the line 3—3 in Fig. 2;

Fig. 4 is a vertical longitudinal section through the rear end of the box only on the line 4—4 in Fig. 3;

Fig. 5 is a detail in horizontal section on an enlarged scale on the line 5—5 in Fig. 4;

Fig. 11 is a detail in vertical section on an enlarged scale on the line 11—11 in Fig. 10;

Figure 12:
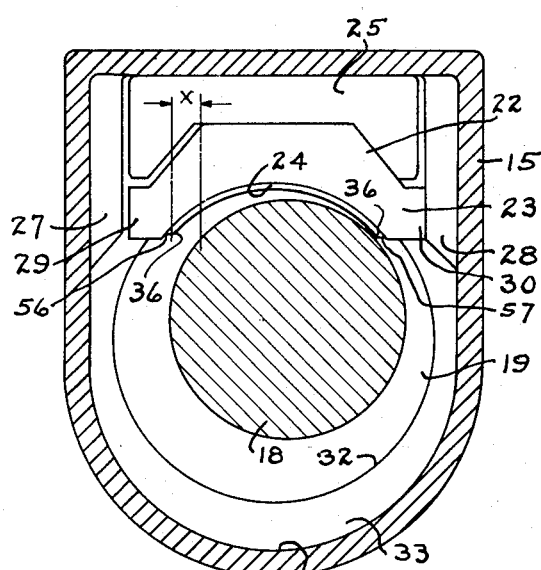
Fig. 12 is a diagrammatic section taken transversely through a standard journal box.

Referring to Figs. 1, 2, and 12, the journal box 15 is herein shown as being an integral part of the truck side frame 16. The wheel axle 17 has a journal 18 extending therefrom and entering the box 15 through a back opening 19.

The journal 18 is standardized as to its diameter and its length depending upon the load capacity, and is provided with an outer end collar 20 and an inner end fillet 21. A bearing designated by the numeral 22 having in general a brass back 23 and the lining 24 is placed over the top side of the journal 18, to rest thereon between the collar 20 and the fillet 21, with a clearance being had at its outer end between it and the collar 20. On the top side of the brass back 23 there is placed a wedge 25 which has its top surface 26 convexly presented to the underside of the top of the box 15, the curvature extending in a longitudinal manner in respect to the journal 18.

Referring specifically to Fig. 12, both the wedge 25 and the brass 23 are loosely positioned between vertically disposed guides 27 and 28 respectively. The brass 23 is provided with side lugs 29 and 30 to come into contact by slight lateral movement with these guides 27 and 28.

The opening 19 is defined by spaced apart ribs 31 and 32, the margins of which define circular openings, and between which there is formed a well 33. Normally there is no free oil in the bottom of the box 15 separating from waste packing 34 carried therein. In any event, the inner rib 32 across the lower portion of the box 15 is sufficiently high to prevent any such free oil should it occur, from entering the well 33. The free space between the ribs 31 and 32 is carried upwardly through the box to have an upper opening 35 providing an entrance into that space.

As indicated, in Fig. 12, the journal 18 is shown as having been shifted relative to the box 15 to the right side therefrom from its normal central position. In this shifted position of the journal 18, it is to be noted that the entire box 15 has been lifted by reason of the journal 18 tending to underride the right-hand lower edge 36 of the liner 24, this action exerting an upwardly directed pressure on the bearing brass 23 causing the lifting of the entire box 15, with the consequent displacement of the liner 24 from the journal 18 as indicated in the drawing. The degree of this displacement is measured on a horizontal line as indicated by the letter X.

The majority of freight cars are equipped with trucks having a minimum of four wheels, and brake shoes are applied to these wheels from one side only. The application of brake pressure therefore tends to force the wheels transversely of the boxes 15, consequently carrying the axles and the journals 18 along therewith.

In checking this displacement X, taking as one example a 70 ton hopper car with 6 x 11 inch journals and four wheel trucks, with the car empty, and standing still, the application of 70 pound brake pressure at the cylinder, produced a displacement dimension, X, of one thirty-second of an inch; on impact test, empty car, and brake set, stopping the car running at six miles per hour, X was 25/64 inch; under the same conditions with the hand brakes off, X was 13/32 inch; with the car empty, and applying an emergency application of air brakes at forty miles per hour, X was 13/32 inch, while a service application at the same speed was 1/16 of an inch; thus indicating the lifting of the bearing from the journal. Under extreme conditions, it has been found that the journal 18 will travel so far as to cause a portion of the axle to strike the ribs 31 and 32 and actually damage them, with the result of rocking at times of the bearing 23 and even displacement of the wedge 25, carrying the waste 24 entirely around from the underside of the journal. As above indicated, conditions and operation are such that applications of one hundred and ten pounds pressure are employed at times, and the sudden impact of stopping of cars due to switching, "humping," and even in starting and stopping a train of freight cars sets up even more severe conditions than indicated in the above results of one test.

A dust guard heretofore made generally of wood, is carried in the well 33 to slide up and down between the ribs 31 and 32, following the travel of the axle 17. The axle 17 is provided with a cylindrical surface 38 having a diameter intermediate that of the axle 17 and the journal 18, the length of this surface 38 extending through the opening provided through the ribs 31 and 32, Fig. 2. The dust guard in general is provided with an opening which fits around this surface 38, with a standard clearance of $\frac{1}{32}$ of an inch over the over-all diameter, plus or minus $\frac{1}{64}$ inch. Thus it is to be seen, that with the dimension X varying beyond the clearance, pressure is exerted on the dust guard on such an extent, that where it exceeds the clearance dimension, the dust guard may be mutilated or even destroyed to such an extent that it becomes useless and has to be replaced. Unless that guard is in position, to seal off the back end of the box 15, the waste 34 very rapidly becomes contaminated with dust and dirt kicked up particularly from the road bed, and in the winter time by snow which melts in warm weather, and then later ice, destroying the lubricating ability of the waste 34.

We employ a dust guard generally designated by the numeral 40 made in a manner peculiarly different from dust guards heretofore employed. This dust guard 40 has a body 41 made out of an elastic material which is oil resistant, and is in fact practically impervious to oil.

This material of the body 41 is a synthetic rubber material, one particular material having the chemical formula of $C_4H_5Cl$. The chemical composition of the material may vary, such as to permit the use of a homologue or isomer, such materials being sold under various trade names or trade-marks and commercially obtainable at the present time.

The important characteristic of the material in addition to being elastic, oil impervious, is that it have the proper degree of hardness, being neither too soft nor too hard. Referring to the durometer scale, a 45 durometer material is too soft, whereas an 85 durometer material is too hard. Therefore the desired and in fact required degree of hardness must reside between those two limits, the 65 durometer rubber material being most desirable.

Figure 7:
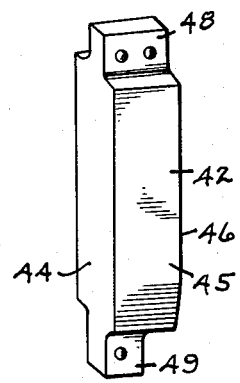
Fig. 7 is a view in side perspective of an impact head used in the dust guard.

Integrally bonded to the body 41 are a pair of impact heads or stops 42 and 43 respectively. Each of these heads 42 and 43 is identical one with the other, hence the head 42 herein shown in Fig. 7 is identical with the head 43. The head 42 has a flat face 44 with a body 45 extending therefrom having a transverse thickness such that it may freely slide in the space between the ribs 31 and 32. The back face, that is the outer face when assembled in the body 41, designated by the numeral 46, rides slidingly over the bottom face 47 in the vertical portion of the well 33. Preferably, the head 42 is provided with an upper and lower tongue 48 and 49 respectively having a thickness less than that of the body 42, so that the body of the resilient material may be flowed around on both sides of those tongues, to have an increased area of bonding to the head rather than relying upon a mere upper and lower butt end well or bond.

Figure 6:
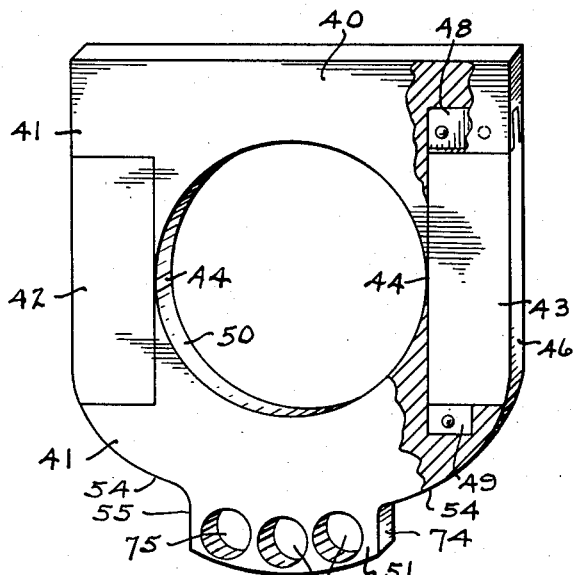
Fig. 6 is a view in perspective of a dust guard construction embodying the invention.

As indicated in Fig. 6, the heads 42 and 43 are bonded directly to the resilient, elastic material of the body 41, to become in fact an integral portion thereof. These impact heads 42 and 43 are as above indicated, spaced apart laterally one from the other a distance so as to permit their outer vertical edges including the faces 46 to ride freely on the vertically disposed faces 47 of the well 33. As indicated, Fig. 6, the material of the body 41 is flowed around on over both the top and lower ends of the bodies in each instance. The inner faces 44 of these heads 42 and 43 are tangential to an opening 50 provided through the body 41, this opening 50 being of that diameter which will permit the axle portion 38 to extend and revolve freely therethrough. In fact the clearance between the diameter of the opening 50 and the diameter of the axle portion 38 is kept within the standard set up therefor, namely 1/32 inch with a tolerance of plus or minus 1/64 inch.

The body 41 being resilient and elastic, needs to be supported in some manner so as to prevent the guard body 40 from riding on the top side of the axle portion 38. Normally the standard dust guard rides on the axle portion 38, to have its lower end hang within the well 33 without touching the bottom thereof. That is permissible because the wooden dust guard is of sufficiently light weight so as to cause little or hardly any appreciable wear.

In the use of the present guard 40, the under side of the body 41 is provided with a tongue 51 to extend down into the well 33, and to rest on the floor 52 thereof, Fig. 3. As indicated in Fig. 6, the under side of the body 41 starts curving from a curved portion of the face 46 of each of the heads 42 and 43, by surfaces 54 which are spaced above the floor 52. The tongue 51 extends downwardly and centrally of the body 41, to have the side vertical faces 74 and 55 continuing downwardly from those curved faces 54. Thus the dust guard 40 is supported from the under side of the tongue 51 on the floor 52 in the well 33 so that the journal 18 may turn in the box 15 with the intermediate surface 39 extending through the hole of the guard and causing no wear on its peripheral surface of the margin of that hole.

The tongue 51 is provided with a series of openings 75 therethrough, herein shown as three in number, these openings being provided as means permitting the tongue 51 to be compressed upwardly without damage to the guard 40 when the box 15 has to be jacked upwardly to permit removal of the bearing 22 for inspection and replacement when necessary. Since the axle remains stationary in respect to the ground, and the box 15 travels upwardly, the guard 40 itself does not move, only the tongue portion 51 is moved into compression, this tongue being distorted to permit the material thereof to be carried into these openings without in any way destroying the properties of the material in that tongue. As a matter of fact, while in most instances, the tongue 51 can be made out of the same material as is that of the body 41, it can be made out of sponge rubber and bonded to the material of the body 41 to afford a much less degree of resistance to compression, in which case the holes 75 could be omitted.

With a dust guard 40 formed in the manner thus far described, reference is made to Fig. 3, wherein it is shown that the impact heads 42 and 43 come into close proximity with the surface of the axle portion 38. Should the axle 17 be displaced due to any of the conditions above enumerated, that displacement relative to the box 15 is prevented due to the fact that the surface 18 will within a very limited degree of travel, not to exceed the clearance between the diameters of the axle portion 38 and the dust guard hole 50, strike the head 42 or 43 as the case may be, and thus prevent relative travel of that axle portion 38 in reference to the box 15, and consequently prevent travel of the journal in reference to the lining 24, Fig. 12.

When that travel is prohibited, there is no hammering of the axle journal 18 on the lining 24, and neither is there any lifting of the brass 23 from the journal due to the application of the air brakes, or impact conditions. In fact the pressure in transverse or fore and aft direction of travel of the axle is removed from the lining 24 and taken by either impact head 42 or 43. This means that the lining 24 is not subject then to having the lining being loosened from intimate bonding with the brass 23; the corners 36 of the lining 24 are not battered down nor caused to flow into the oil grooves 56 and 57 provided along the edges of the lining and the undermost edges of the brass 23, Fig. 12. Neither is the brass 23 lifted from the journal 18, and consequently there is no space X for any waste to enter thereunder.

Now it has been discovered that a rigid dust guard body 41 is damaged, even with the use of impact heads 42 and 43 limiting travel of the axle relative to the box 15. This body 41 has been found to give excellent operating conditions when it is made out of a resilient, elastic material of the above type indicated. The frames 16 are not always square with the axle, the box 15 may be tilted, and other conditions may be presented whereby there is a tendency for the axle to shift the impact heads 42 and 43 either upwardly or downwardly in relation to the box 15, and unless that movement is absorbed in a resilient manner, damage to the dust guard is going to arise. Therefore one of the essential qualities of the dust guard 40 is that the body 41 be resilient and elastic.

Modified forms of the dust guard 40 may be employed such as is indicated in Figs. 8-11, wherein two modified forms of guards, namely 40A and 40B are illustrated. The guard 40A has its body 60 made out of the same resilient, elastic material as above indicated for use in the guard 40. In this guard 40A, impact heads 61 and 62 are employed, to have inner opposing faces 63 and 64 arcuate to conform to the curvature of the axle portion 38 so that when that portion is inserted through the guard 40A, these heads 61 and 62 will hold the guard 40A in a position whereby its under edge 65 is spaced above the floor 52 of the well 33 the normal distance which will permit the box 15 being jacked up relative to the axle in order to permit the removal and replacement of the bearings 22. In other words in this form of guard 40A, the guard is supported to ride on the axle portion 38. The wear in this case is taken on the surfaces 63 and 64. These heads 61 and 62 have widths to permit them to slide freely within the space between the two ribs 31 and 32 in vertical directions, and they have their upper and lower ends integrally bonded to upper and lower body portions 60a and 60b.

The impact heads 42 and 43, and 61 and 62, are in each form made out of a metal which is of a different hardness than that of the axle portion 38, in order the portion 38 may not only revolve thereagainst freely without danger of seizing, but will not become fractured under the extreme forces of impacts between the axle portion 38 and those heads. Also it is to be noted that the heads in both forms have quite extended surfaces of bearings against the bottom faces of the well in the vertical portions thereof, namely the faces 47 so that the pressure of the impact is extended over the sides of the box 15 a considerable length so as to prevent damage to the box itself.

Figure 8:
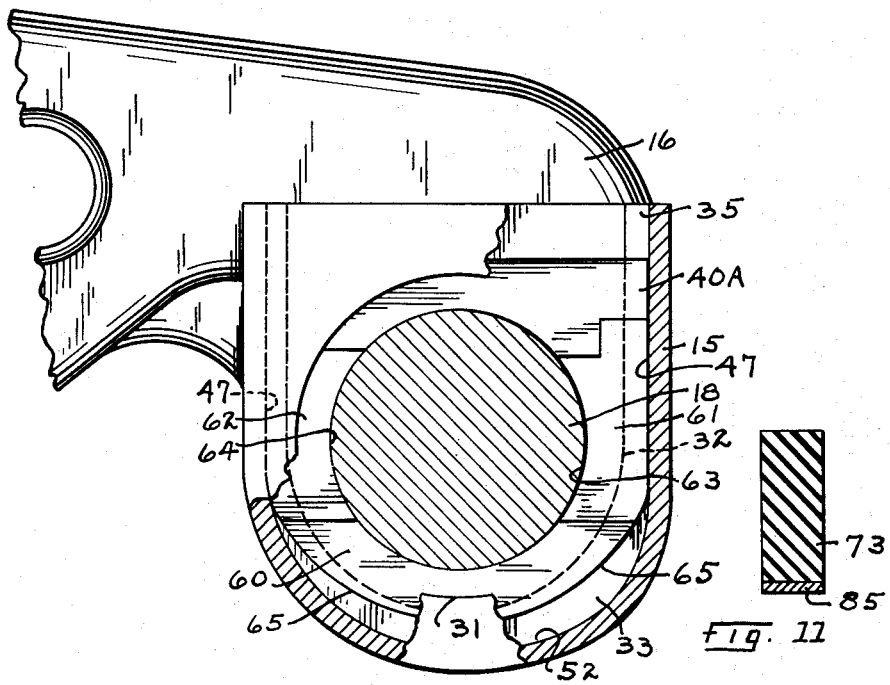
Fig. 8 is a view in section similar to that in Fig. 3, but showing a modified form of dust guard structure.
Figure 9:
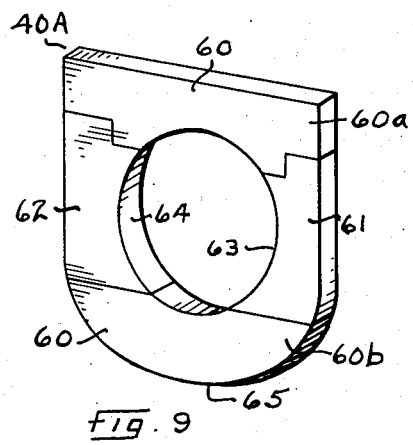
Fig. 9 is a view in perspective of a dust guard of that form employed in the structure shown in Fig. 8.
Figure 10:
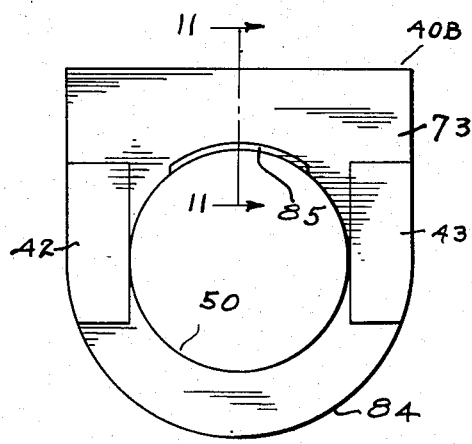
Fig. 10 is a front elevation of a dust guard of a still further modified form.

In that form of dust guard 40B as illustrated in Fig. 10, the body 73, is made out of the same resilient, elastic material as above defined, and has the impact heads 42 and 43 integrally attached thereto by bonding, but in this form, the underside of the body 73 is rounded to present the surface 84 which will be spaced above the floor 52 of the well 33 in the same manner as is illustrated in Fig. 8 in reference to the dust guard 40A. In this form, the guard will have to hang in suspension from or on the axle portion 38, and therefore means of preventing undue wear in the upper portion of the body 73 riding on that axle part 38 is inserted in the body 73. This insertion 85 is made to become an integral portion of the body 73 by being placed therein at the time it is molded or formed in the desired shape.

The material of this insert 85, which is arcuate in nature, conforming to the curvature of the hold 50, is made out of a blend of Buna N synthetic rubber plus a phenolic resin. The United States Rubber Company has a composition of this nature available under the trade-mark "Enrup."

The characteristics of this insert 85 is that it will bond intimately with the material of the body 73, and most importantly, while being impervious to oil, will not seize or freeze to the metallic surface of the axle portion 38 under extreme cold weather conditions. Furthermore this material has an excellent wear resisting quality which will carry the weight of the dust guard 40B over long periods of time without appreciable wear. Thus the resilient, elastic nature of the body 73 is preserved even down to the wearing surface contact with the axle portion 38. It is to be noted that the impact heads 42 and 43 in this modified form of dust guard 40B, have their inner opposing faces tangential to the opening 50 so as to be available for prompt contact with the axle portion 38 when the tendency for relative movement of the axle with the box 15 is set up.

A combination diner-lounge car, Illinois Central Railroad No. 4005, operating every day, making a round trip from between Chicago and Dubuque, Iowa, having single brakes on 12 wheels, operating at high train speeds, and with air brake pressures at the cylinders up to 110 pounds required a full replacement of the entire complement of bearings on the average of every 90 days due to the single brake action shifting the axles relative to the journal boxes, causing spreading of the linings 24 on one side, or distorting the brass 22 by impact against the lugs. The normal inspection of bearings in this service is once each three months, but it is to be noted that the bearings in this service would not run that normal period. In the normal inspection of the bearings, the waste 34 is repacked.

The invention described and shown herein, was applied to this same car, and the normal six months inspection was made regularly. The installation of the present invention was made a little more than 18 months ago, and upon the third inspection of the bearings, August 14, 1950, all bearings, were still in service as originally installed, and were allowed to remain in service except one bearing which was removed to show how the life of bearings may be preserved by use of the invention.

Figure 13:
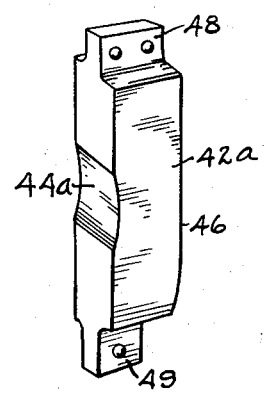
Fig. 13 is a view in side perspective of an impact head similar to that in Fig. 7, but with an arcuate axle contact surface.

Referring to Fig. 13, the impact head 42a may have a slightly arcuate axle contact surface 44a if desired in place of the approximate line contact as provided in the head 42.

While we have herein shown and described our invention in the particular forms set forth, it is obvious that structural changes may be employed, as well as material changes, without departing from the spirit of the invention, and we therefore do not desire to be limited to the precise forms described, beyond the limitations which may be imposed by the following claims.

We claim:

1. For a journal box having a dust guard well vertically disposed at its inner end with an opening to receive the journal end of an axle therethrough, an integral dust guard formed to ride slidingly in said well and having a hole therethrough, the margin of which hole will closely surround said axle as a means of vertically locating the guard in the well by the axle; said guard having opposite side impact heads of a hardness exceeding that of said axle and substantially filling in the spaces between the axle and the fore and aft walls of said well to confine travel of the axle relative to the box to substantially vertical directions only; said guard comprising a body, to which said heads are permanently bonded; said body being characterized by being of a rubber-like nature to be resilient and elastic; and means supporting said body to withhold it from wearing contact on the upper side of the axle; said impact heads consisting of substantially rectangular metal bars bonded into said body by top and bottom ends, and having their inner vertical faces substantially tangential to the margin of said hole through the guard; the face edges of said bars being parallel and extending above and below the tangential zones into said body.

2. For a journal box having a dust guard well vertically disposed at its inner end with an opening to receive the journal end of an axle therethrough, an integral dust guard formed to ride slidingly in said well and having a hole therethrough, the margin of which hole will closely surround said axle as a means of vertically locating the guard in the well by the axle; said guard having opposite side impact heads of a hardness exceeding that of said axle and substantially filling in the spaces between the axle and the fore and aft walls of said well to confine travel of the axle relative to the box to substantially vertical directions only; said guard comprising a body, to which body said heads are permanently bonded; said body being characterized by being of a rubber-like nature to be resilient and elastic; and means supporting said body to withhold it from wearing contact on the upper side of the axle; said body supporting means comprising a body lower end portion shaped to rest on the floor of said well; said body lower end portion having a greater degree of vertical compressibility than that of the body; and said body lower end portion being provided with at least one transverse opening therethrough adjacent its bottom edge.

3. A device for controlling fore and aft travel of an axle in relation to a railway car journal box, comprising a pair of metallic axle impact heads; an elastic rubber-like body to which said heads are bonded permanently thereto in horizontally spaced apart relation to have the spacing therebetween slightly greater than the diameter of said axle; said body having an opening therethrough between said heads to accommodate said axle; and a body supporting tongue extending integrally downwardly from said body for a distance to provide a rest on a bottom portion of said box; said tongue being perforated between its lower end and said body to provide vertical compression of the tongue to a length less than its normal length under lifting of said box relative to said axle; the material of both said body and said tongue having a durometer hardness within the range of 45 to 85.

WILLIAM T. BISSELL.
THOMAS W. POTTER.

References Cited in the file of this patent

UNITED STATES PATENTS

| Number | Name | Date |
| --- | --- | --- |
| 684,141 | Walsh | Oct. 8, 1901 |
| 686,715 | Crone | Nov. 19, 1901 |
| 1,015,551 | Gamage | Jan. 23, 1912 |
| 1,336,428 | Gothner | Apr. 13, 1920 |
| 2,159,825 | Stevens | May 23, 1939 |
| 2,445,597 | Bissell | July 20, 1948 |
| 2,487,669 | Pattullo et al. | Nov. 8, 1949 |

FOREIGN PATENTS

| Number | Country | Date |
| --- | --- | --- |
| 367,771 | Germany | of 1923 |
| 539,005 | Great Britain | of 1941 |